US012707120B2

(12) United States Patent
Kelly et al.

(10) Patent No.: US 12,707,120 B2
(45) **Date of Patent: *Aug. 11, 2026**

(54) LOW-LATENCY CONTENT DELIVERY OVER A PUBLIC NETWORK

(71) Applicant: Circle Computer Resources, Inc., Cedar Rapids, IA (US)

(72) Inventors: Seth Kelly, Cedar Rapids, IA (US); James Baird, Cedar Rapids, IA (US); Josh Merrifield, Cedar Rapids, IA (US)

(73) Assignee: Circle Computer Resources, Inc., Cedar Rapids, IA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/790,009

(22) Filed: Jul. 31, 2024

(65) Prior Publication Data

US 2024/0422391 A1 Dec. 19, 2024

Related U.S. Application Data

(63) Continuation of application No. 17/081,490, filed on Oct. 27, 2020, now Pat. No. 12,101,532.

(51) Int. Cl.
*H04N 21/434* (2011.01)
*H04N 21/435* (2011.01)
(Continued)

(52) U.S. Cl.
CPC ..... *H04N 21/4622* (2013.01); *H04N 21/4345* (2013.01); *H04N 21/4355* (2013.01); *H04N 21/84* (2013.01)

(58) Field of Classification Search
CPC ........... H04N 21/4622; H04N 21/4345; H04N 21/4355; H04N 21/84
(Continued)

(56) References Cited

U.S. PATENT DOCUMENTS 8,949,912 B2 2/2015 Casey
9,247,317 B2 1/2016 Shivadas
(Continued)

FOREIGN PATENT DOCUMENTS

CA 2784779 C 11/2015
CA 2833392 C 8/2019
(Continued)

OTHER PUBLICATIONS

Preliminary Report on Patentability and Written Opinion dated May 11, 2023 from related International Patent Application No. PCT/US2021/056655.
(Continued)

*Primary Examiner* — Alfonso Castro
(74) *Attorney, Agent, or Firm* — SHUTTLEWORTH & INGERSOLL, PLC; Jason R. Sytsma

(57) ABSTRACT

A transcoding engine communicatively coupled to a broadcast source receiver for receiving the broadcast stream, decoding the broadcast stream, extracting and storing the PSIP tables from the broadcast stream and inserting metadata into the decoded broadcast stream, encoding the broadcast stream and the metadata, and attaching the PSIP tables to the encoded broadcast stream. A listener server device is communicatively coupled to the transcoding engine for receiving the encoded broadcast stream and establishing a low-latency tunnel with a caller client over a public internet and providing the encoded broadcast stream to the caller client through the low-latency tunnel.

21 Claims, 5 Drawing Sheets

(51) Int. Cl.
*H04N 21/462* (2011.01)
*H04N 21/84* (2011.01)

(58) Field of Classification Search
USPC .......................................................... 725/32
See application file for complete search history.

(56) References Cited

U.S. PATENT DOCUMENTS

| | | | | |
|---|---|---|---|---|
| 9,350,780 | B2 | 5/2016 | Good | |
| 9,392,307 | B2 | 7/2016 | Cranman | |
| 9,712,890 | B2 | 7/2017 | Shivadas | |
| 9,854,018 | B2 | 12/2017 | Wang | |
| 9,860,612 | B2 | 1/2018 | Good | |
| 10,263,875 | B2 | 4/2019 | Isaksson | |
| 10,270,829 | B2 | 4/2019 | Giladi | |
| 10,284,912 | B2 | 5/2019 | Frusina | |
| 10,306,308 | B2 | 5/2019 | Nair | |
| 10,389,784 | B2 | 8/2019 | Denoual | |
| 10,582,232 | B1 * | 3/2020 | Rundle | H04N 21/8456 |
| 11,019,367 | B2 | 5/2021 | Wei | |
| 11,274,929 | B1 | 3/2022 | Afrouzi | |
| 2004/0017831 | A1 * | 1/2004 | Shen | H04N 21/2362 370/537 |
| 2010/0175099 | A1 | 7/2010 | Kim | |
| 2010/0180007 | A1 | 7/2010 | Suh | |
| 2011/0222403 | A1 | 9/2011 | Suh | |
| 2012/0265892 | A1 | 10/2012 | Ma | |
| 2013/0195168 | A1 | 8/2013 | Singh | |
| 2014/0313289 | A1 | 10/2014 | Kim | |
| 2015/0032858 | A1 | 1/2015 | Motrenko | |
| 2015/0127848 | A1 | 5/2015 | Houdaille | |
| 2016/0219024 | A1 | 7/2016 | Verzun | |
| 2016/0337424 | A1 | 11/2016 | Mandyam | |
| 2016/0373499 | A1 | 12/2016 | Wagner | |
| 2017/0195716 | A1 | 7/2017 | Ramaswamy | |
| 2018/0026733 | A1 | 1/2018 | Yang | |
| 2018/0048567 | A1 * | 2/2018 | Ignatchenko | H04L 45/3065 |
| 2018/0302455 | A1 | 10/2018 | Bordoloi | |
| 2018/0332094 | A1 | 11/2018 | Braness | |
| 2019/0141373 | A1 | 5/2019 | Van Deventer | |
| 2019/0222872 | A1 * | 7/2019 | Bohm | H04N 21/23106 |
| 2019/0253742 | A1 * | 8/2019 | Garten | H04N 21/251 |
| 2019/0289052 | A1 | 9/2019 | Boutet | |

FOREIGN PATENT DOCUMENTS

| | | | |
|---|---|---|---|
| CN | 104885473 | A | 9/2015 |
| CN | 105516739 | A | 4/2016 |
| EP | 3162075 | A1 | 5/2017 |
| EP | 3772220 | A1 | 2/2021 |
| ES | 2748209 | T3 | 3/2020 |
| JP | 2018082445 | A | 5/2018 |
| JP | 2018186524 | A | 11/2018 |
| JP | 6612249 | B2 | 11/2019 |
| KR | 101719998 | B1 | 3/2017 |
| WO | 2020086452 | A1 | 4/2020 |

OTHER PUBLICATIONS

ATSC Organization: "A65/2013—Program and System Information Protocol for Terrestrial Broadcast and Cable", ATSC, Advanced Television Systems Committee, 1776 K Street N.W., Washington D.C. 20006, USA, Aug. 7, 2013 (Aug. 7, 2013), XP017861342, Retrieved from the Internet: URL:https://www.atsc.org/wp-content/uploads/2021/04/A65_2013.pdf.

* cited by examiner

LOW-LATENCY CONTENT DELIVERY OVER A PUBLIC NETWORK

PRIORITY

This Non-Provisional U.S. Patent Application is a continuation of U.S. patent application Ser. No. 17/081,490 filed on Oct. 27, 2020 titled, LOW-LATENCY CONTENT DELIVERY OVER A PUBLIC NETWORK, the entire contents of each of which are hereby incorporated by reference herein.

TECHNICAL FIELD

This disclosure relates to low-latency delivery of content over a public network, and more specifically, this disclosure relates to delivering broadcast content over the public internet.

BACKGROUND INFORMATION

Broadcast analytics is big business. Much of this is made possible by the digitalization of broadcasting that allows the broadcast stream to carry metadata in addition to video and audio. Embedded in the metadata is information about the program's title and the date and time it was created, details about the video and audio material itself, technical details such as scanning format, colorimetry and audio parameters, archive details such as dates and times of creation and versions, artistic details, as well as a host of other things.

Much of the value of metadata is the ability to get the information in real-time or as near to real-time as possible. This problem is made difficult in the United States, for example, with hundreds of media markets or designated market areas (DMAs), which are geographical areas or regions where a population can receive the same or similar broadcasts. This means that for accurate analysis, it is useful to receive simultaneously information from each DMA for broadcast analysis. This typically means obtaining information about hundreds of channels at each of the hundreds of DMAs at a single location for analysis.

Transmission of real-time broadcast streams over the public internet, however, is fraught with issues. Broadcast streams, from a data perspective, are large and cumbersome to deal with resulting in dropped packets and possible late arrival due to latency from point A to point B. Transport protocols previously used to send video across a network, like user datagram protocol ("UDP") multicast or RTP, suffer serious transmission issues going across such an unstable medium as the public internet. To overcome these issues, over the top providers have adopted transport protocols that require converting and compressing the broadcast content to their required format to drastically reduce the size for transport while retaining low latency.

Over the top providers have migrated to types of adaptive bitrate streaming protocols like HLS/DASH or in tandem with CMAF and RTMP and leveraging expensive CDN providers to guarantee low-latency transport. These protocols transmit the stream in segments and allow for retransmission signaling between the client and server so lost packets can be detected and resent to the client to maintain stream integrity. Buffers provided on the client and server increase the time available for a late packet to arrive, especially in the case of a retransmission due to lost data, allowing it to still be played with the rest of the video without introducing artifacts or frame freezes. While considered low-latency transmission, these adaptive bitrate streaming protocols suffer from latency/delay issues even around seven (7) seconds that make them problematic for streaming live broadcasts or in applications where faster delivery of broadcast streams is required such as real time data analytics.

Accordingly, there is a need for systems and methods for faster content delivery over the public internet.

SUMMARY

In accordance with one aspect of the present invention, disclosed is a low-latency content delivery system. The system comprises of a broadcast source receiver for receiving a broadcast stream. A transcoding engine is communicatively coupled to the broadcast source receiver for receiving the broadcast stream, decoding the broadcast stream, extracting and storing the PSIP tables from the broadcast stream and inserting metadata into the decoded broadcast stream, encoding the broadcast stream and the metadata, and attaching the PSIP tables to the encoded broadcast stream. A listener server device is communicatively coupled to the transcoding engine for receiving the encoded broadcast stream and establishing a low-latency tunnel with a caller client over a public internet and providing the encoded broadcast stream to the caller client through the low-latency tunnel.

In another aspect, the low-latency tunnel comprises media packets, response packets, and retransmission packets, wherein the encoded broadcast stream is streamed as media packets from the listener server to the caller client over the low-latency tunnel. The caller client can request from the listener server a missing packet with response packets. The listener server transmits the missing packet to the caller client using retransmission packets through the low-latency tunnel. The missing packet can be reinserted into its temporal place for chronological display.

In another aspect, an archival storage for storing the encoded broadcast stream is provided. The missing packet of the encoded broadcast stream can be obtained from the archival storage. Also, the caller client and the listener server comprise a listener buffer and a caller buffer, respectively, and each is sized at least 2.5 times a total roundtrip time between the same. The archival storage can be communicatively coupled with the transcoding engine for storing the encoded broadcast stream in one minute interval blocks wherein a missing packet of the encoded broadcast stream is found in one of the one minute interval blocks obtained from the archival storage for recovery.

In another aspect, the transcoding engine further stores timing data for the broadcast stream on a frame by frame basis and resynchronizes metadata on a corresponding frame by frame basis with the broadcast stream using the timing data. The metadata can comprise a post-stream timestamp equaling the time for processing the broadcast stream.

In other aspects, methods for low-latency content delivery are provided. The methods can comprise receiving a broadcast stream from a broadcast source receiver; decoding the broadcast stream; extracting and storing the PSIP tables from the broadcast stream; inserting metadata into the decoded broadcast stream; encoding the broadcast stream and the metadata; attaching the PSIP tables to the encoded broadcast stream; establishing a low-latency tunnel with a caller client over a public internet; and providing the encoded broadcast stream to the caller client through the low-latency tunnel.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
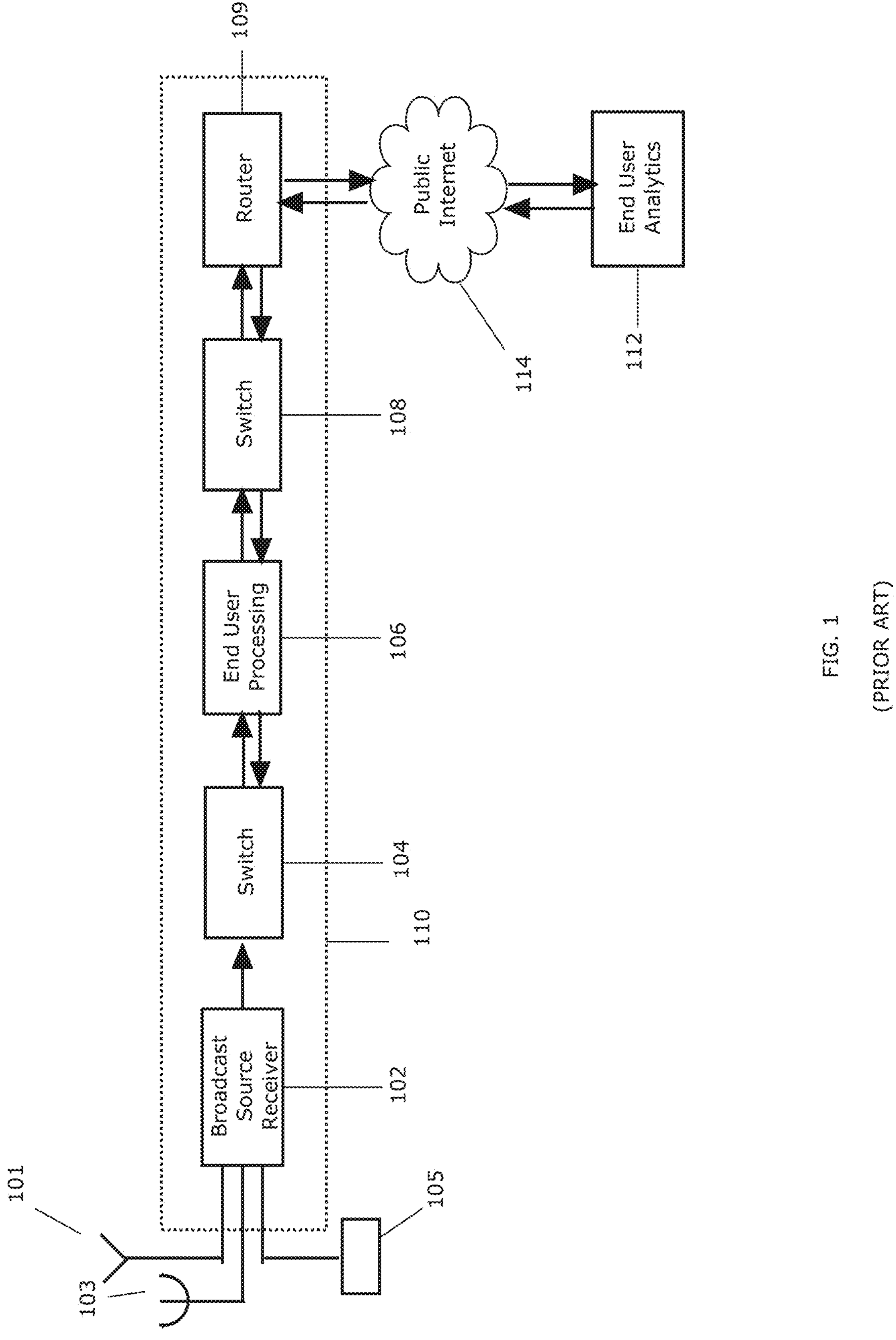
FIG. 1 is a prior art network block diagram for content delivery over a public network.

Referring to FIG. 1, shown is a prior art network block diagram for content delivery over a public network. In this arrangement, broadcast media is received, compressed, and delivered over the public internet to the end user for analysis. It is important to recognize that the methods and systems for receiving, compressing, and delivering are all contained in a single facility 110 so the resultant delivery content is compressed and delivered to the end user 112 over the public internet 114 with minimal latency. This however, as described in the background, requires each end user 112 to have the necessary equipment at each facility 110. It also requires the end user 112 to make difficult decisions as to the stream formatting, size, and quality as well as what metadata needs preserved, removed, or added. These decisions dramatically affect the speed, stability and cost of the delivery over the public internet 114.

A broadcast source receiver 102 receives broadcast media. Such media content can be a combination of video, audio, and metadata received by an antenna 101 from an over-the-air stream, a satellite antenna 103, and/or a cable modem 105. Such sources are non-exhaustive and may include any media transmission technology. The broadcast stream may refer to any media delivered and played back simultaneously without requiring a completely downloaded file.

The broadcast stream is transmitted to a switch 104 with IP multicast functionality to forward the broadcast media to one or more requested end-users processing servers 106. End-user processing server extracts and compresses the meta-data, audio, and/or video data of interest and passes it along to a router 109, which provides remote connectivity to end user 112 over the public internet 114. Additional components and/or steps can be included like a switch 108 for local connectivity to other devices within facility 110. Of particular note in all of this is that this prior art arrangement requires end user 112 to have, for example, the foregoing equipment for each channel and in each DMA around the United States.

Figure 2:
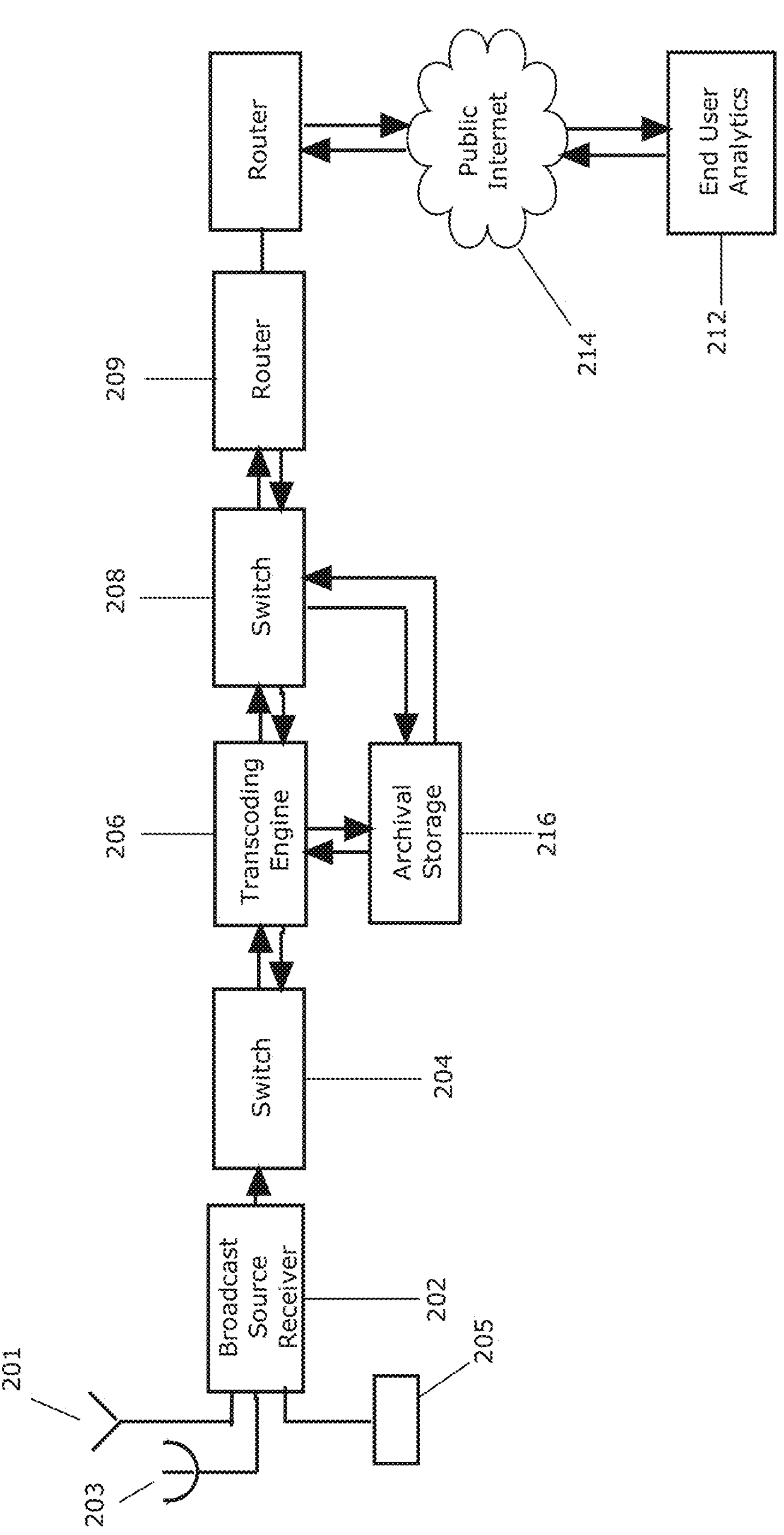
FIG. 2 is a network block diagram for content delivery over a public network, according to this disclosure.

Hereinafter described, are improved systems and methods for low-latency content delivery over a public internet. FIG. 2 shows a network block diagram for content delivery over a public network.

A broadcast source receiver 202 receives broadcast media. Such media content can be a combination of video, audio, and metadata received by an antenna 201 from an over-the-air stream, a satellite antenna 203, and/or a cable modem 205. Such sources are non-exhaustive and may include any media transmission technology. The broadcast stream may refer to any media delivered and played back simultaneously without requiring a completely downloaded file.

The broadcast stream is transmitted to a switch 204 in IP multicast format to forward the broadcast media to a transcoding engine 206. Transcoding engine 206 decompresses the broadcast stream, combines it with metadata, as described below, and encodes the stream for delivery to end user 212 over a public internet 214.

Figure 3:
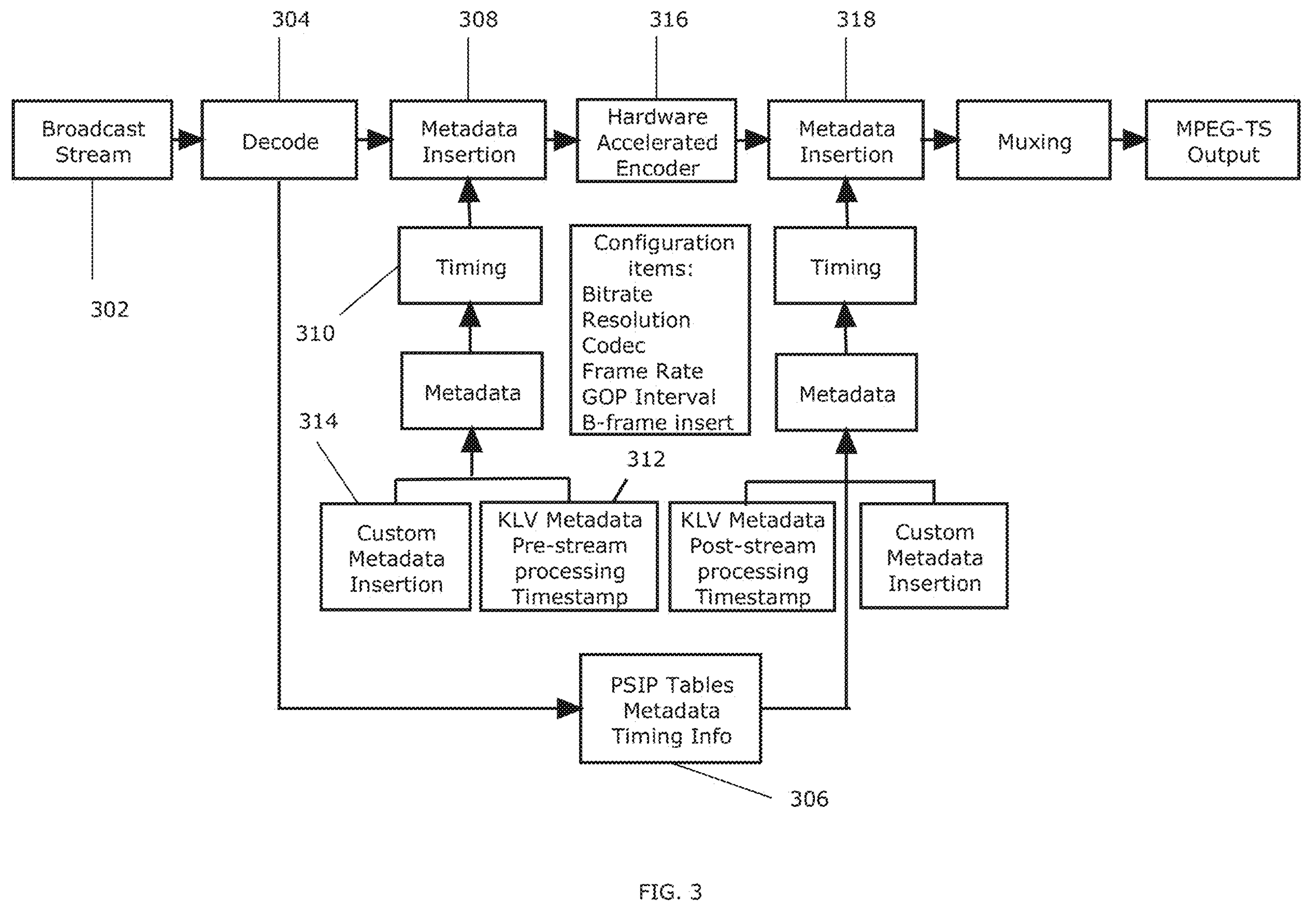
FIG. 3 is a block diagram of a broadcast stream processing flow inside the transcoding engine of FIG. 2.

Turning briefly to FIG. 3, which shows the broadcast stream processing flow inside transcoding engine 206. Transcoding engine 206 receives broadcast stream 302 from broadcast source receiver 202 through switch 204. Such broadcast stream 302 is typically in a compressed state when it is transmitted from the source. The first step is to decode 304 broadcast stream 302, which contains a Program and System Information Protocol (PSIP) table that define virtual channels, content ratings, electronic program guides and other information to be decoded and displayed by the tuner. These PSIP tables 306 are stored and forwarded preserving synchronization with each frame of the broadcast stream 302. Once the decoding is complete, any metadata needed prior to encoding or desired by end-user 212 is inserted at step 308 to each frame of the decoded broadcast stream. This includes timing data 310, KLV pre-stream processing stamps 312, which is a custom metadata value that shows the exact time a frame started processing, and any other custom metadata 314.

Next the metadata and the broadcast stream are encoded by a hardware accelerated encoder 316 inside transcoding engine 206. The stream is compressed and configured with transcoding parameters, such as bitrate to reduce bandwidth required for transmission, codec to enable higher compression such as mpeg2 to H264, resolution, frame rate, GOP interval, B-frame insertion and other stream processing settings as supported. Any other transcoding parameters can also be configured.

After the stream has been encoded, additional metadata can be combined with the stream along with the PSIP tables that were stored and tagged prior to decoding 304 of broadcast stream 302. The broadcast stream's 302 timing data 310 is stored and forwarded like the PSIP tables and is used to resynchronize metadata to the video stream during the metadata insertion 318. An additional Post-stream processing timestamp is added to be used for calculating the time taken processing the stream from 304 to 318. The resultant transcoded broadcast stream can be packaged in a file or transport stream format such as MPEG-TS or MP4 for broadcast content delivery, using protocols such as MPEG-TS, RTP, HLS, UDP Multicast, etc. . . .

Figure 4:
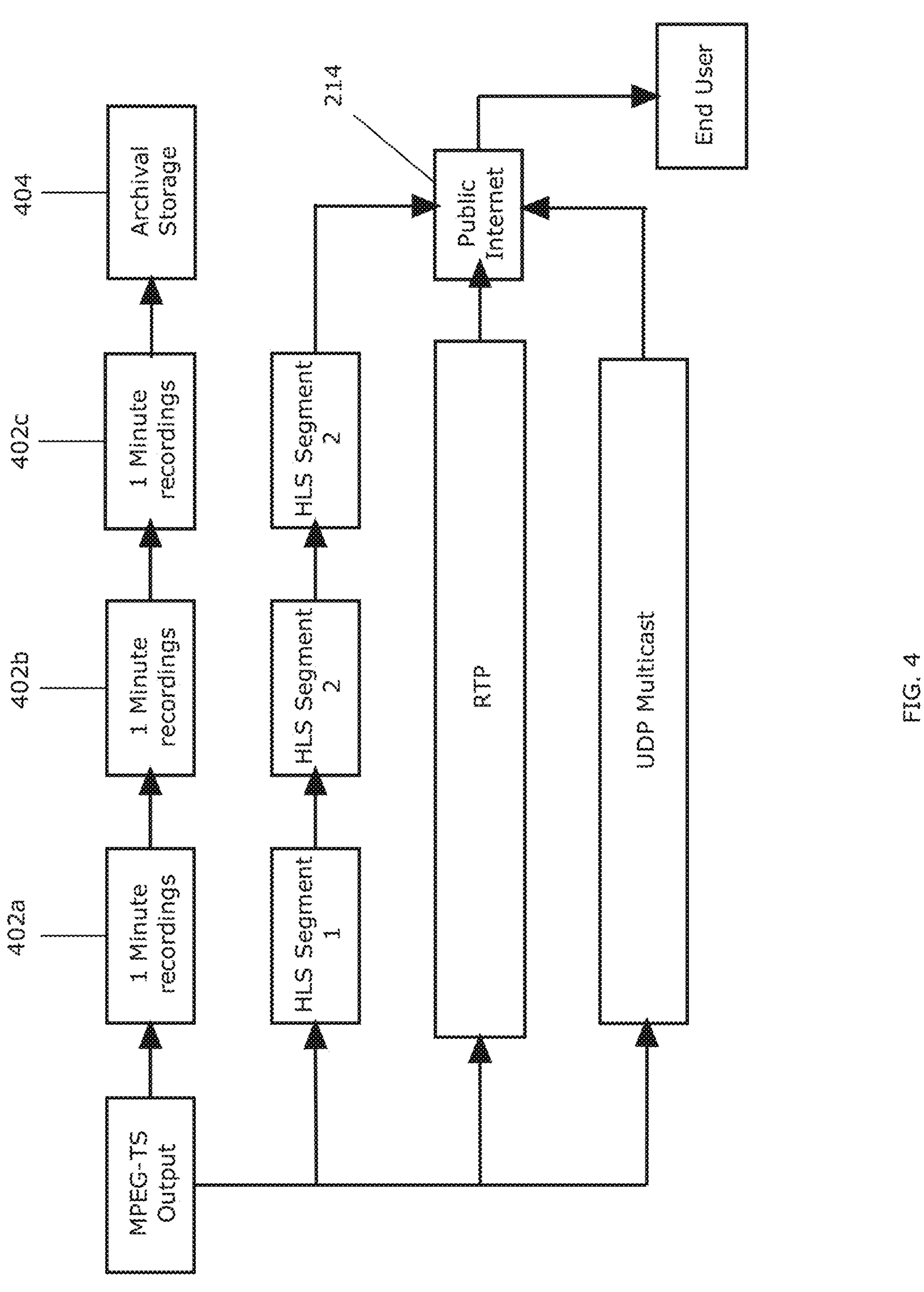
FIG. 4 shows a block diagram of the output packaging process inside the transcoding engine of FIG. 2.

More specifically, FIG. 4 shows a block diagram of the output packaging process inside transcoding engine 206. Data segments of the in the output file format are stored and archived 404 in one (1) minute interval blocks 402*a*, 402*b*, 402*c*, . . . 402*n*. Turning briefly back to FIG. 2, an archival storage 216 for storing the data segments is shown. This allows end user 212 to request and receive archived clips from archive storage 216 if packets or segments are lost during transmission.

Simultaneously, the broadcast stream is streamed to end user 212 over public internet 214. The transcoded broadcast stream from FIG. 3 is provided to either a router 209, which provides remote connectivity to end-user 212 over the public internet 214 or to a switch 208 for local connectivity to other devices. Of particular note in that end-user can receive from each desired channel in each DMA around the United States the original broadcast stream with any desired original or custom metadata added, formatted to client specifications retaining low latency.

Figure 5:
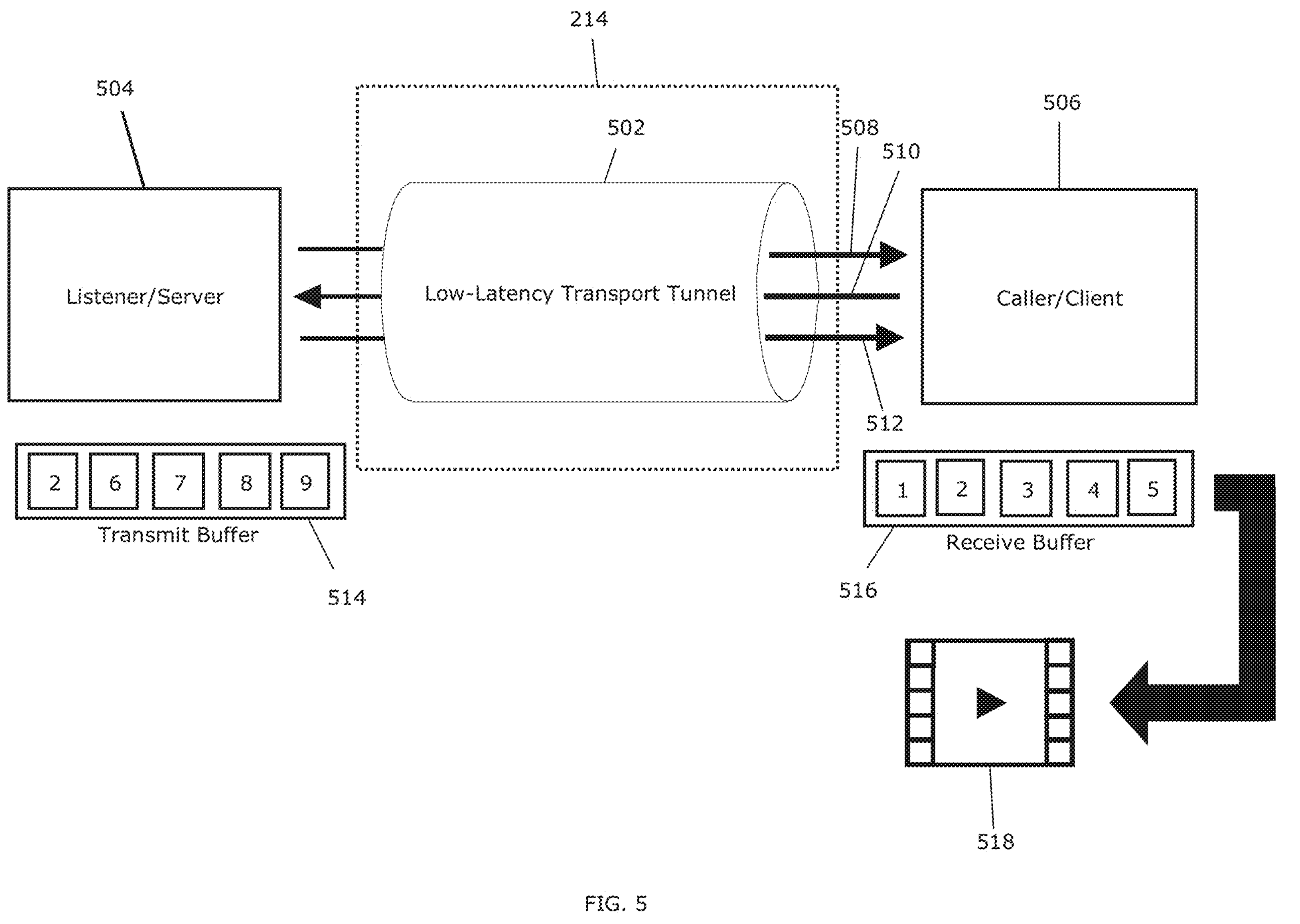
FIG. 5 shows a low latency transport tunnel between disparate network devices over the public internet.

As stated above, after processing of the broadcast stream is complete and it is packaged in a file or transport stream format such as MPEG-TS or MP4 for broadcast content delivery, and packetized using network protocols such as MPEG-TS, RTP, HLS, UDP Multicast, etc. a low latency transport tunnel is established between transcoding engine 206 and end user 212 over public internet 214. FIG. 5 shows a low latency transport tunnel 502 between disparate network devices over public internet 214. In one implementation, a listener server 504 and a caller client 506 separated by public internet 214 establish low latency transport tunnel 502. Low latency transport tunnel 502 comprises of media packets traffic 508, response packets traffic 510, and retransmission packets traffic 512. Listener server 504 and caller client 506 comprise a transmit buffer 514 and a receive buffer 516, respectively. For streaming across public internet 214, transmit buffer 514 and a receive buffer 516 are each about 2.5 times the total round trip time for retransmission. So, for example, if the round trip time 1 ms measured from a bit leaving listener server 504, arriving at caller client 506 and returning to listener server 504, then the buffer size is at least 2.5 ms. While a larger buffer can be provided, the smallest useable buffer is 2.5 times the roundtrip time between listener server 504 and caller client 506.

FIG. 5 shows an example of packet 2 being lost in transit. Caller client 506 receives packets 1 through 5 as media packets 508 and stores them in receive buffer 516 with each frame moving out of receive buffer 516 and to a player 518 at end user 212 when its presentation time has arrived. Assuming, packet 2, was lost in transit, caller client 506 sends a response packet 510 to listener server 504 requesting packet 2 where packet 2 is obtained from the transmit buffer 514. Packet 2 is then transmitted to caller client 506, but this time as a retransmission packet 512 where, if possible, packet 2 is inserted into its temporal place in receive buffer 516 for chronological display on player 518. If a retransmitted media packet does not arrive in the receive buffer 516 in time to be forwarded to the player 518 in time for presentation, then the packet is lost as is the data therein. This will happen in the event of network/power/system issues between the listener server 504 and the caller client 506. In the event of lost data, clients can use the archive storage system (FIG. 2 216 and FIG. 4 404) to recover lost data in the form of one-minute clips that the client can use to splice into existing video. While this will not supply the user with a low latency delivery at this point, it allows the client to have consistent historical data even with outages that would have traditionally ended as an unrecoverable data loss.

Those skilled in the art would recognize that one or more devices described herein can be implemented in a single device or separated in to separate devices. For example, transcoding engine 206 and archival storage 216 can be housed in a single server or separated into separate servers. Moreover, redundancy of components can be provided for back up and fail safe purposes.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A low-latency content delivery system comprising:

a broadcast source receiver for receiving a broadcast stream comprising PSIP tables associated with each frame of the broadcast stream; and a transcoding engine communicatively coupled to the broadcast source receiver for receiving the broadcast stream, decoding the broadcast stream, extracting and storing PSIP tables from the broadcast stream while preserving synchronization of the PSIP tables with each frame of the broadcast stream, inserting a first set of custom metadata into a decoded broadcast stream on a frame by frame basis, wherein the custom metadata is metadata not found in the broadcast stream as received by the broadcast source receiver, encoding the broadcast stream and the first set of custom metadata, and resynchronizing and attaching the PSIP tables with each frame of the encoded broadcast stream.

2. The low-latency content delivery system of claim 1, wherein the first set of custom metadata inserted into the decoded broadcast stream comprises a pre-stream processing time stamp on each frame of the decoded broadcast stream.

3. The low-latency content delivery system of claim 2, wherein the first set of custom metadata inserted into the decoded broadcast stream comprises at least one chosen from customized timing data, pre-processing timestamp, indexing frame.

4. The low-latency content delivery system of claim 2, wherein the transcoding engine attaches a second set of custom metadata to each frame of the encoded broadcast stream, wherein the second set of custom metadata comprises a post-stream processing timestamp for calculating the processing time of each frame of the encoded broadcast stream from the time when each frame of the broadcast stream is decoded to the time when each frame is encoded with the first set of custom metadata and the post-stream processing timestamp is attached to each frame of the encoded broadcast stream.

5. The low-latency content delivery system of claim 1, wherein the PSIP tables defines information to be decoded and displayed by the tuner.

6. The low-latency content delivery system of claim 5, wherein the information to be decoded and displayed by the tuner is at least one chosen from virtual channels, content ratings, and electronic program guides.

7. The low-latency content delivery system of claim 6, wherein the transcoding engine further stores timing data for the broadcast stream on a frame by frame basis and resynchronizes PSIP on a corresponding frame by frame basis with the broadcast stream using the timing data.

8. The low-latency content delivery system of claim 1, and further comprising archival storage communicatively coupled with the transcoding engine for storing the encoded broadcast stream in one minute interval blocks wherein a missing packet of the encoded broadcast stream is found in one of the one minute interval blocks obtained from the archival storage for recovery.

9. The low-latency content delivery system of claim 1, and further comprising a listener server communicatively coupled to the transcoding engine for receiving the encoded broadcast stream and establishing a low-latency tunnel with a caller client over a public internet and providing the encoded broadcast stream to the caller client through the low-latency tunnel.

10. The low-latency content delivery system of claim 9, wherein the low-latency tunnel further comprises media packets, response packets, and retransmission packets, wherein the encoded broadcast stream is streamed as media packets from the listener server to the caller client over the low-latency tunnel, wherein the caller client requests from the listener server a missing packet with response packets, and wherein, the listener server transmits the missing packet to the caller client using retransmission packets through the low-latency tunnel.

11. The low-latency content delivery system of claim 10, wherein the missing packet is reinserted into its temporal place for chronological display.

12. The low-latency content delivery system of claim 10, and further comprising archival storage for storing the encoded broadcast stream.

13. The low-latency content delivery system of claim 12, wherein the missing packet of the encoded broadcast stream is obtained from the archival storage.

14. The low-latency content delivery system of claim 9, wherein the caller client and the listener server comprise a listener buffer and a caller buffer, respectively.

15. The low-latency content delivery system of claim 14, wherein the listener buffer and the caller buffer are each sized at least 2.5 times a total roundtrip time between the same.

16. The low-latency content delivery system of claim 1, and further comprising a caller client communicatively coupled to the transcoding engine for receiving the encoded broadcast stream and establishing a low-latency tunnel with a listener server over a public internet and providing the encoded broadcast stream to the listener server through the low-latency tunnel.

17. A method for low-latency content delivery, the method comprising:

receiving a broadcast stream comprising PSIP tables from a broadcast source receiver;

decoding the broadcast stream;

extracting and storing the PSIP tables from the broadcast stream;

inserting a first set of custom metadata into the decoded broadcast stream, wherein the first set of custom metadata comprises metadata not found in the broadcast stream as received by the broadcast source receiver;

encoding the broadcast stream and the first set of custom metadata;

attaching the PSIP tables to the encoded broadcast stream;

establishing a low-latency tunnel with a caller client over a public internet; and providing the encoded broadcast stream to the caller client through the low-latency tunnel.

18. The method of claim 17, and further comprising streaming the encoded broadcast stream as media packets from a listener server to the caller client over the low-latency tunnel; requesting by the caller client from the listener server a missing packet with response packets; transmitting the missing packet to the caller client using retransmission packets through the low-latency tunnel; and inserting the missing packet into its chronological place.

19. The method of claim 18, and further comprising using a transcoding engine communicatively coupled to the broadcast source receiver for decoding the broadcast stream; and using a listener server device communicatively coupled to the transcoding engine for establishing the low latency tunnel.

20. The method of claim 17, and further comprising storing the encoded broadcast stream in one minute interval blocks wherein a missing packet of the encoded broadcast stream is found in one of the one minute interval blocks; and obtaining the missing packet from an archival storage for recovery.

21. The method of claim 17, and further comprising providing a listener buffer and a caller buffer each of a size equal to at least 2.5 times a total roundtrip time between the same.

* * * * *